Aug. 16, 1955  A. E. BROWN  2,715,685
DYNAMO-ELECTRIC MACHINE AND RECIPROCABLE
POWER UNIT THEREFOR
Filed March 23, 1953  3 Sheets-Sheet 3
FIG. III
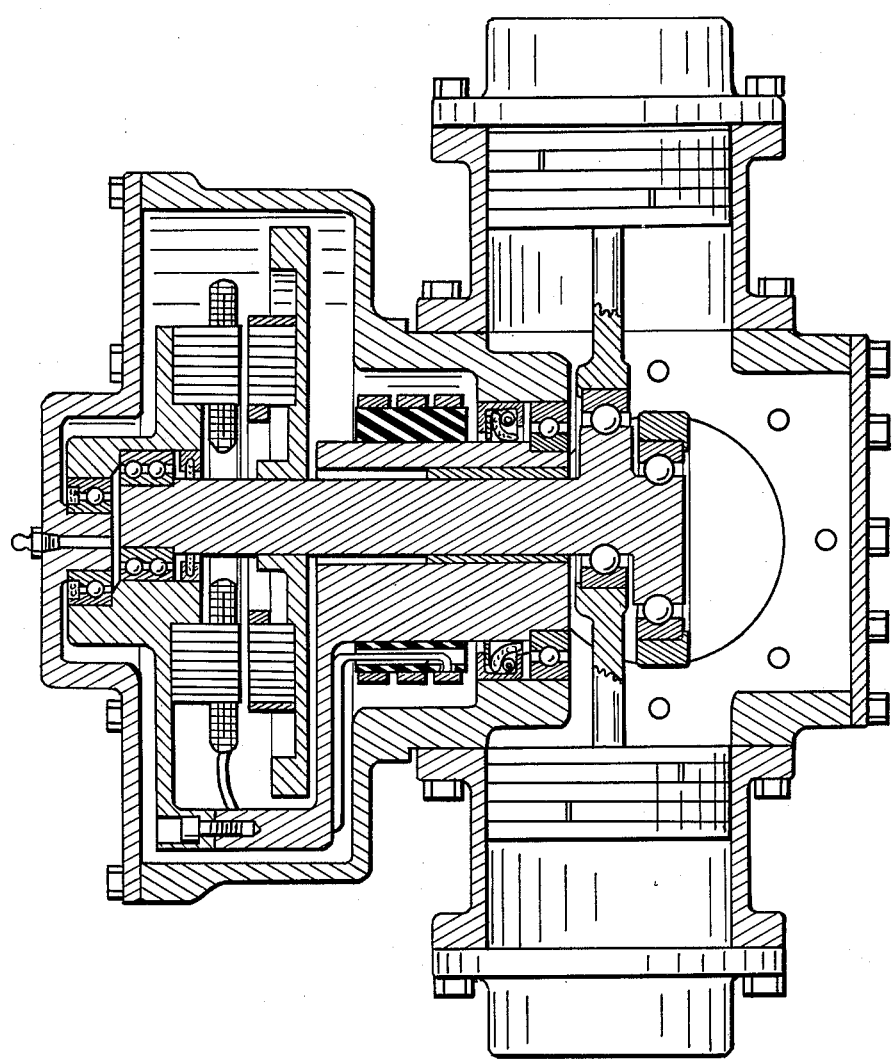
INVENTOR.
Arthur E. Brown

United States Patent Office 2,715,685
Patented Aug. 16, 1955

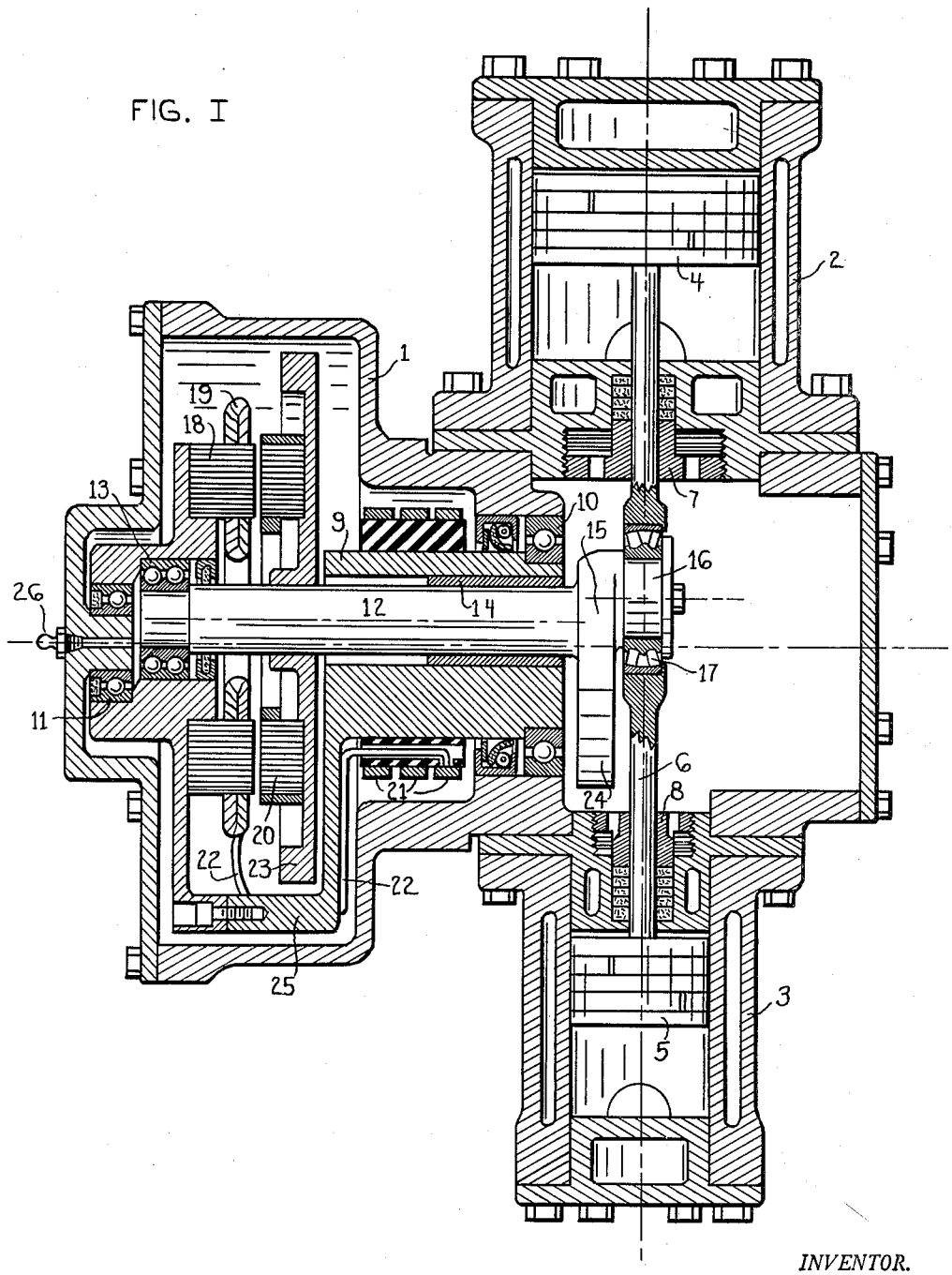
FIG. I
INVENTOR.
Arthur E. Brown

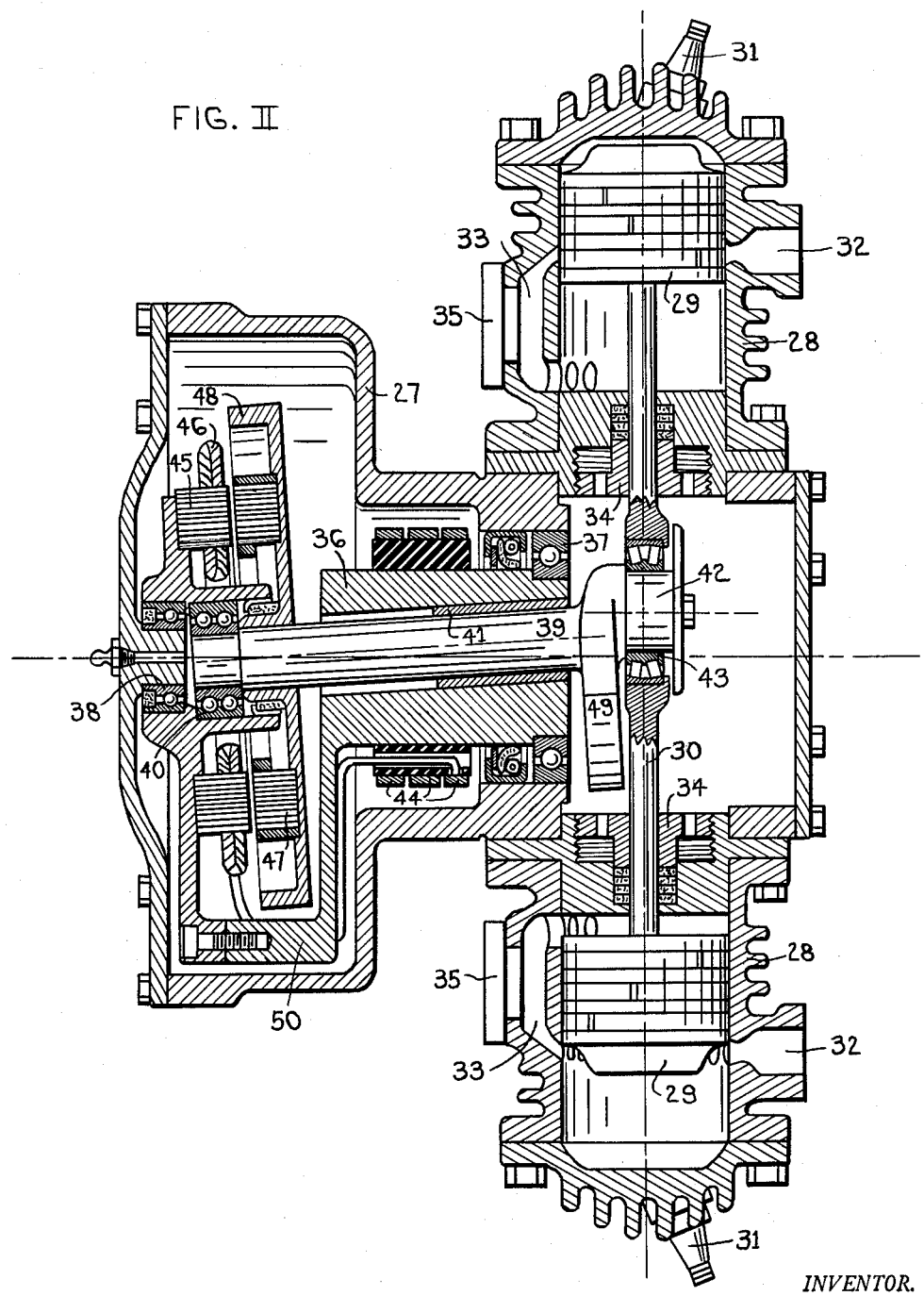
FIG. II
INVENTOR.
Arthur E. Brown

2,715,685

DYNAMO-ELECTRIC MACHINE AND RECIPROCABLE POWER UNIT THEREFOR

Arthur E. Brown, Scotia, N. Y.

Application March 23, 1953, Serial No. 344,180

10 Claims. (Cl. 290—1)

This invention relates to a power unit in which a dynamo electric machine is adapted to drive (or be driven by) a reciprocable member. One particular application of the invention is a reciprocating compressor powered by an electric motor. A second particular application is a reciprocating engine adapted to drive an electric generator.

Prior to this invention, many types of mechanisms have been developed in which a dynamo electric machine is adapted to drive (or be driven by) a reciprocable member. One common type of drive mechanism developed prior to this invention is the familiar crank-connecting rod mechanism. A disadvantage of the crank-connecting rod mechanism (when employed with a reciprocable piston) is that the piston is subjected to an undesirable lateral or side thrust against the cylinder wall due to angularity of the connecting rod. If however, a cross head and cross head guide construction is used with the crank-connecting rod mechanism, then the side thrust will be born by the cross head instead of by the piston. The cross head and cross head guide arrangement, however, has the disadvantages of increasing the reciprocating weight and lengthening the machine so that it is not as compact in overall dimensions. Also, the addition of a cross head and cross head guide makes the machine more complicated and considerably increases the cost of construction.

The crank-connecting rod mechanism also has the disadvantage that the inertia forces of the various moving parts are not perfectly balanced. This is due to the fact that the acceleration force on the reciprocable member is higher at the top dead center position than at the bottom dead center position. This in turn means that a counterweight selected to counterbalance the acceleration force at the top dead center position is too large to exactly counterbalance the acceleration force at the bottom dead center position. Also, the weight of the connecting rods exert lateral inertia forces which cannot be counterbalanced except by special complicated means.

In an air or gas compressor, it is often desirable to make the piston double acting so as to compress gas on both sides of the piston. Due to the fact that a connecting rod has an angular motion (instead of a straight line rectilinear motion) it is not possible to seal the connecting rod with an ordinary stuffing box. Therefore it is customary to employ a cross head and cross head guide with the crank-connecting rod mechanism in order to make a compressor piston double acting. This in turn introduces the disadvantages previously mentioned in regard to the use of a cross head and cross head guide.

Another disadvantage of the crank-connecting rod mechanism is the fact that the piston or reciprocating member does not move with simple harmonic motion. Instead, the piston moves with a motion in which the acceleration is higher at the top dead center position than at bottom dead center position. This has the disadvantage that the maximum acceleration force is higher for a given speed of rotation and length of stroke. This characteristic of the crank-connecting rod mechanism is one factor which limits the speed at which it is practicable to operate the mechanism.

Many conventional compressors (of the crank connecting rod type) employ a belt drive between the electric driving motor and the crankshaft of the compressor. The purpose of the belt drive is to obtain a speed reduction so that a high speed motor may be used to drive the compressor. The pulleys and belts required increase the cost of the machine and also make the machine less compact.

Other conventional compressors (of the crank-connecting rod type) employ slow speed electric driving motors directly connected to the crank shaft of the compreessor. This system has the disadvantage that a slow speed electric driving motor is larger, more costly, and as a rule, is less efficient than a high speed motor of the same power rating.

A second mechanism, developed prior to this invention, is the familiar Scotch yoke mechanism which consists of a slotted yoke member mounted for reciprocation, a slider member adapted to slide in the slot of the yoke member, and a crankshaft. The slider member is rotatably mounted on the crankpin of the crankshaft. The Scotch yoke mechanism has a disadvantage in that the reciprocating yoke member is subjected to an undesirable side thrust due to an unbalanced crank effort. Also, the slider member slides back and forth in a groove in the yoke member on a linear bearing. In a linear bearing, it is difficult to maintain a lubricating oil film for supporting the load. The Scotch yoke mechanism also has the disadvantage that the yoke member tends to spread so that the slot becomes wider at the middle. This in turn causes the slider member to fit too loose in the yoke member. Another disadvantage of the Scotch yoke mechanism is that it is not dynamically balanced unless a plurality of yoke members are driven by one crankpin.

A general object of my invention is to provide a mechanism in which a dynamo electric machine is adatped to drive (or be driven by) a reciprocable member.

Another object is to provide a mechanism in which there is little (if any) lateral thrust on the reciprocable member.

Another object is to provide a mechanism in which the inertia forces of the moving parts are dynamically balanced.

A particular advantageous feature of my invention is that when the mechanism is employed as a compressor, the electric driving motor makes two effective rotations while the reciprocating pistons make only one forward and back stroke. This is a speed reduction feature which is incorporated in the special kinematic linkage employed. This speed reduction feature permits the use of a high speed motor without introducing the complication and extra cost of a pulley and belt system.

An advantageous feature of this invention is that when the mechanism is employed in a compressor or an engine, the piston can be made double-acting without the addition of a cross head or a cross head guide (as is required with the conventional crank-connecting rod mechanism).

Another object of the invention is to provide a mechanism which is more compact, simpler in construction, and less costly to produce.

Another object of the invention is to provide a mechanism in which the reciprocable member reciprocates with the more advantageous simple harmonic motion instead of the characteristic motion of a mechanism employing a connecting rod. Because the reciprocable member moves with simple harmonic motion, the inertia forces are equal at each end of the stroke and the inertia forces can be exactly counterbalanced at each end of the stroke with counterweights. Also, the maximum acceleration is less when the reciprocable member moves with simple harmonic motion instead of the motion characteristic of a crank-connecting rod mechanism.

A feature of my invention is that the reciprocable member may be operated at a higher speed because the reciprocable member moves with simple harmonic motion and because there is little if any side thrust on the reciprocable member and because the mechanism is well balanced.

Another object of my invention is to provide an electric generating plant which is simple in construction, compact, dynamically balanced, and in which the electric generator makes two effective rotations during one forward and back stroke of the reciprocating piston.

Other objects and advantages will become apparent from the following description and the accompanying drawings.

In the drawings, numerals are employed to designate like parts.

Figure I is a sectional view of a two-cylinder double-acting compressor driven by an electric motor. The section view is taken on the axis of the cylinders and on the axis of the carrier. The electric driving motor is adapted to move with both a planetary and a differential motion.

Figure II is a sectional view of a generating plant in which a two-clinder two-cycle internal combustion engine is adapted to drive an electric generator. The electric generator is adapted to have a differential motion, and the axis of the electric generator has a nutating motion.

Figure III illustrates a mechanism which is similar to the mechanism shown in Figure I except that it has four cylinders, four pistons, and two eccentrics instead of two cylinders, two pistons, and a single crankpin.

Refer to Figure I. A casing 1 serves as a supporting frame for enclosing and supporting the various parts in proper spaced relation. The particular compressor shown is of the two stage double acting type and is provided with a low pressure cylinder 2 and a high pressure cylinder 3. Pistons 4 and 5 are reciprocable in their respective cylinders. A common piston rod 6 is rigidly fastened to both pistons. Stuffing boxes 7 and 8 are adapted to seal around the piston rod. A carrier member 9 is rotatably mounted in the casing 1. The carrier member is rotatably supported on the ball bearings 10 and 11. A planetary crankshaft 12 is rotatably supported in the carrier 9 by means of the double row ball bearing 13 and the plain sleeve bearing 14. The axis of the planetary crankshaft 12 is offset from the axis of rotation of the carrier member by an amount equal to one-fourth of the length of stroke of the pistons. The planetary crankshaft is provided with a crankarm 15 and crankpin 16. The axis of the crankpin 16 is offset from the axis of the planetary crankshaft 12 by an amount equal to one-fourth the length of stroke of the pistons. The crankpin 16 is rotatably connected to the common piston rod 6 by means of the spherical roller bearing 17. An electric motor is mounted on the carrier member and the planetary crankshaft. In the particular design shown, the electric induction motor is of the type which is commonly known as an "axial air gap motor." In this type of motor, the air gap is measured in an axial direction instead of in a radial direction.

The term "dynamo electric machine" is a generic term which includes both electric motors and electric generators. A dynamo electric machine generally contains two magnetic elements each consisting of an iron core and conductor windings. When describing a dynamo electric machine it is often customary to refer to the two magnetic elements as the "stator" and the "rotor." In this particular application however, both magnetic elements rotate and it would therefore be confusing to refer to them as the "stator" and the "rotor." Therefore, the terms, "primary magnet member" and "secondary magnet member" will be used to designate the two magnetic elements of a dynamo electric machine. These terms will be used both in the following description and in the claims.

The primary magnet member 18 of the electric motor is rigidly fastened to the carrier member 9. The primary magnet member 18 and its windings 19 are mounted coaxial with the axis of the planetary crankshaft 12. The secondary magnet member 20 of the motor is rigidly mounted on the planetary crankshaft 12. Slip rings 21 are provided on the carrier. Brushes are adapted to ride against the slip rings. The brushes cannot be seen in Figure I because they are located behind the carrier member.

In operation, electrical energy (from an external source) is supplied to the motor windings through the brushes, slip rings 21, and lead wires 22. This in turn causes the primary magnet member 18 to rotate in one direction and the secondary magnet member 20 to rotate in the opposite direction. The electric motor is said to have a differential motion because both the primary and the secondary magnet members rotate. The crankpin 16 is rotatably connected to the piston rod 6 and is therefore constrained to reciprocate in a straight line on the axis of the cylinders. In order for the crankpin 16 to follow a straight line, the planetary crankshaft 12 and the carrier member 9 must rotate with equal speed but in opposite directions. The crankpin 16, piston rod, and pistons therefore serve to synchronize the rotation of the planetary crankshaft and the carrier member so that they rotate with equal speed and in opposite directions of rotation. The only side thrust on the pistons is that necessary to prevent the planetary crankshaft and the carrier member from drifting out of synchronism and this amount of side thrust is small or is negligible. The secondary magnet member receives its turning force from the primary magnet member and this means that the torque supplied by the secondary magnet member is inherently equal and opposite in direction to the torque supplied by the primary magnet member. Therefore when a given torque is applied to the carrier member by the primary magnet member, an equal and opposite torque will be applied to the planetary crankshaft by the secondary magnet member. This unique cooperative action results in a balance of forces such that very little if any side thrust is imposed on the pistons by the crankpin 16.

The flywheel effect of the crankshaft plus the flywheel effect of the parts which are fastened to the crankshaft should be substantially equal to the flywheel effect of the carrier plus the flywheel effect of the parts which are fastened to the carrier plus the flywheel effect on the carrier of the parts which are carried by the carrier. This is necessary in order to prevent unequal torques (due to differences in flywheel effect) from occurring during changes in rotative speed of the carrier and the crankshaft. Unequal torques would cause the crankpin 16 to exert a side thrust on the pistons. This was one reason that an axial air gap motor (instead of a radial air gap motor) was selected for the motor driven compressor design shown in Figure I. A flywheel 23 is provided so as to equalize the flywheel effect of the carrier and the crankshaft.

In some designs, it is desirable to have more than two cylinders and two pistons in one machine. One method of accomplishing this is to mount two or more eccentrics on the planetary crankshaft (as shown in Figure III) instead of a single crankpin as is shown in Figure I. The pistons may then be rotatably connected to the eccentrics. If two eccentrics are used, they may be mounted adjacent each other and 180 degrees out of phase from each other. A balance of weights (about the axis of the planetary crankshaft) is obtained by mounting the eccentrics 180 degrees out of phase from each other. If only one reciprocable member is employed, (such as is shown in Figure I) then a planetary counterweight 24 is located opposite the crankpin in order to counterbalance the weight of the pistons and piston rod about the axis of the planetary crankshaft.

In order to obtain a balance of parts, the carrier member and the parts mounted on the carrier member and the parts carried by the carrier member should be balanced about the axis of rotation of the carrier member. To do this, a carrier counterweight 25 is provided on the carrier member.

The ball bearings 11 and 13 may both be lubricated through the grease fitting 26.

In order to make one complete forward and back motion of the pistons, it is necessary for the primary magnet member to make one complete rotation relative to the casing. Also, the secondary magnet member makes one complete rotation (relative to the casing) during the same time interval. However, during the same time interval, the primary magnet member and the secondary magnet member make two rotations relative to each other. This is in effect a 2 to 1 speed reduction. If a 1750 R. P. M. electric induction motor is used to drive the compressor, then the pistons would make 875 complete forward and back strokes per minute. This speed reduction effect is an important feature of the invention. Many conventional compressors employ a set of V belts and two sheaves in order to obtain a speed reduction between the electric driving motor and the compressor. These complicating speed reduction devices are thus not required in the planetary-differential drive system taught in this invention.

Calculations have been made to determine the best relative size of the various parts shown in Figure I. This was done in order to determine if the mechanism is practicable.

Refer to Figure II which illustrates a two cylinder internal combustion engine adapted to drive an electric generator. The motion of the parts of the mechanism shown in Figure II is similar to the motion of the parts of the mechanism shown in Figure I except that the crankshaft has a nutating motion. The crankshaft is said to have a nutating motion because the axis of the crankshaft moves in an orbit describing a conical surface. The casing 27 supports and encloses the various parts. The two cycle internal combustion engine design shown includes the cylinders 28, the pistons 29, the common piston rod 30 rigidly fastened to the pistons, the ignition plugs 31, the exhaust ports 32, the by-pass ports 33, the stuffing boxes 34, and the pressure actuated inlet valves 35. A fuel system not shown may be attached to the inlet valves. The carrier member 36 is rotatably supported in the casing on the ball bearings 37 and 38. A nutating crankshaft 39 is rotatably mounted in the carrier member on the ball bearing 40 and the plain sleeve bearing 41. The nutating crankshaft is provided with a crankpin 42 which is rotatably connected to the piston rod by means of the spherical roller bearing 43. The throw of the crankpin is substantialy equal to one-fourth the stroke of the pistons. The axis of the crankpin is not parallel to the axis of the crankshaft. At the position shown (which is at the end of a stroke) the axis of the crankpin is parallel to the axis of the carrier member. The dynamo electric machine shown is an axial air gap induction generator. Electric energy is taken off by means of the slip rings 44 and brushes. The primary magnet member 45 and its windings 46 are fastened to the carrier member and the secondary magnet member 47 is fastened to the nutating crankshaft. A flywheel 48 is fastened to the crankshaft. The purpose of the flywheel is equalization of the inertia of the carrier member and the inertia of the crankshaft, so as to prevent unequal torques (due to differences in inertia) from occurring during changes in rotative speed of the crankshaft and the carrier. The nutating crankshaft is inclined at an oblique angle so that the center of the secondary magnet member is located near the axis of rotation of the carrier member. By using a nutating crankshaft (instead of a planetary crankshaft as shown in Figure I) the secondary magnet member can be located near the axis of the carrier member. This in turn means that the bearings which support the crankshaft are not subject to a high load due to the centrifugal force of the secondary magnet member 47 and flywheel 48. A counterweight 49 is provided on the crankshaft opposite the crankpin. A counterweight 50 is provided on the carrier.

In the design shown in Figure II, the primary magnet member makes two rotations relative to the secondary magnet member during one forward and back stroke of the pistons. This is a speed increasing feature which causes the generator to operate at a faster effective speed and is advantageous because the generator can be made smaller and more efficient for a given power output.

An advantageous feature of the design shown in Figure II is that the inertia force of the reciprocating parts is air cushioned at each end of the stroke by compressed air in the cylinders. Because of the air cushioning effect, this means that the inertia forces on the bearings is less.

Both pistons 29 are rigidly fastened to a common piston rod 30. The engine is of the two cycle type and thus when one piston is on a power stroke, the other piston is on a compression stroke. This means that the force (on a piston) required for a compression stroke is supplied directly from the opposite piston which is on a power stroke. This cooperative action reduces the loads on the various bearings because the force (on a piston) required for a compression stroke is not transmitted through the bearings.

One method of starting the internal combustion engine shown in Figure II is to reciprocate the pistons by introducing compressed air to the cylinders.

Although I have illustrated and described certain specific embodiments of the invention, it will be apparent that numerous modifications might be made without departing from the scope of the invention. For instance, the mechanism could be employed where it is desired to drive a reciprocable member other than a piston. It is therefore my intention that such scope be limited only by the appended claims.

I claim:

1. A power unit comprising a supporting frame for supporting parts in proper spaced relation, a reciprocable member, said reciprocable member being reciprocable relative to said supporting frame, a carrier member rotatably mounted in said supporting frame, a crankshaft rotatably mounted in said carrier member, said reciprocable member being rotatably connected to said crankshaft at a position eccentric from the axis of said crankshaft, a dynamo electric machine, said dynamo electric machine having a primary magnet member and a secondary magnet member, one of said magnet members being fastened to said carrier member, the other magnet member being fastened to said crankshaft, and said magnet members adapted to rotate relative to each other.

2. The combination recited in claim 1; wherein a counterweight is fastened to said carrier member so as to substantially obtain a balance of weights about the axis of the carrier member; and wherein slip rings and brushes are provided for transmitting electrical energy between said dynamo electric machine and a position fixed on said supporting frame.

3. A power unit comprising a supporting frame for supporting parts in proper spaced relation, a reciprocable member, said reciprocable member being reciprocable relative to said supporting frame, a carrier member rotatably mounted in said supporting frame, a planetary crankshaft rotatably mounted in said carrier member, said reciprocable member being rotatably connected to said crankshaft at a position eccentric from the axis of said planetary crankshaft, a dynamo electric machine, said dynamo electric machine having a primary magnet member and a secondary magnet member, one of said magnet members being fastened to said carrier member, and the other magnet member being fastened to said planetary crankshaft.

4. A power unit comprising a supporting frame for supporting parts in proper spaced relation, a reciprocable member, said reciprocable member being reciprocable relative to said supporting frame, a carrier member rotatably mounted in said supporting frame, a crankshaft rotatably mounted in said carrier member, the axis of said crankshaft being located at an oblique angle to the axis of rotation of said carrier member, said reciprocable member being rotatably connected to said crankshaft at a position eccentric from the axis of said crankshaft, a dynamo electric machine having a primary magnet member and a secondary magnet member, one of said magnet members being fastened to said carrier member, and the other magnet member being fastened to said crankshaft.

5. A compressor machine comprising a supporting frame for supporting parts in proper spaced relation, a cylinder fastened to said supporting frame, a piston reciprocable in said cylinder, valve means, a carrier member rotatably mounted in said supporting frame, a crankshaft rotatably mounted in said carrier member, said piston being rotatably connected to said crankshaft at a position eccentric from the axis of said crankshaft, an electric driving motor, said electric driving motor having a primary magnet member and a secondary magnet member, one of said magnet members being fastened to said carrier member, and the other magnet member being fastened to said crankshaft.

6. A compressor machine comprising a supporting frame for supporting parts in proper spaced relation, a cylinder fastened to said supporting frame, a piston reciprocable in said cylinder, valve means, a carrier member rotatably mounted in said supporting frame, a planetary crankshaft rotatably mounted in said carrier member, said planetary crankshaft having a crankpin, said piston being rotatably connected to said crankpin, an induction type electric driving motor, said electric driving motor having a primary magnet member and a secondary magnet member, said electric driving motor having an axial air gap between said primary magnet member and said secondary magnet member, one of said magnet members being fastened to said carrier member, the other magnet member being fastened to said planetary crankshaft, a flywheel fastened to said planetary crankshaft, a counterweight fastened to said carrier member, said counterweight serving to counterbalance the weight of said flywheel and said electric driving motor, and slip rings and brushes provided for transmitting electrical energy from a position fixed on said supporting frame to said electric driving motor.

7. The combination recited in claim 1, wherein the flywheel effect of the crankshaft plus the flywheel effect of the parts fastened to the crankshaft is substantially equal to the flywheel effect of the carrier plus the flywheel effect of the parts fastened to the carrier plug the flywheel effect on the carrier of the parts carried by the carrier such that there is substantially no side thrust on the reciprocable member due to speed variations of the carrier member and the crankshaft.

8. An electric generating plant comprising a supporting frame for supporting parts in proper spaced relation, an internal combustion cylinder fastened to said supporting frame, a piston reciprocable in said cylinder, means for generating gas pressure in said cylinder so as to motivate said piston, a carrier member rotatably mounted in said supporting frame, a crankshaft rotatably mounted in said carrier member, said reciprocable member being rotatably connected to said crankshaft at a position eccentric from the axis of said crankshaft, an electric generator, said electric generator having a primary magnet member and a secondary magnet member, one of said magnet members being fastened to said carrier member, and the other magnet member being fastened to said crankshaft, a counterweight fastened to said carrier member, said counterweight serving to counterbalance the weight of said electric generator, and slip rings and brushes for transmitting electrical energy from said electric generator to a position fixed on said supporting frame.

9. The combination in a power unit of a supporting frame for supporting parts in proper spaced relation, a plurality of reciprocable members mounted for reciprocation relative to said supporting frame, a carrier member mounted for rotation relative to said supporting frame, a planetary crankshaft rotatably mounted in said carrier member, said reciprocable members being rotatably connected to said crankshaft at positions eccentric from the axis of said crankshaft, a dynamo electric machine having a primary magnet member and a secondary magnet member, one of said magnet members being connected to and rotatable with said carrier member, the other magnet member being connected to and rotatable with said planetary crankshaft, said primary magnet member having electrically conductive windings, and means for transmitting electrical energy between said windings and a position fixed on said supporting frame.

10. The combination in a power unit of a supporting frame for supporting parts in proper spaced relation, a dynamo electric machine having a primary magnet member and a secondary magnet member, both of said magnet members being mounted for rotation relative to said supporting frame, one of said magnet members being adapted to rotate in one direction relative to said supporting frame and the other magnet member being adapted to rotate in the opposite direction relative to said supporting frame, said magnet members being rotatable relative to each other, said primary magnet member having electrically conductive windings, means for transmitting electrical energy between said windings and a position fixed on said supporting frame, a first crank member and a second crank member, said first crank member being adapted to rotate in one direction relative to said supporting frame and said second crank member being adapted to rotate in the opposite direction relative to said supporting frame, one of said magnet members being connected to and rotatable with said first crank member, the other magnet member being connected to and rotatable with said second crank member, a reciprocable member mounted for reciprocation relative to said supporting frame, said reciprocable member being articulatively connected to both of said crank members, and said magnet members being adapted to make two rotations relative to each other during each time interval that the reciprocable member makes one forward and back stroke relative to the supporting frame.

References Cited in the file of this patent

UNITED STATES PATENTS

| | | |
|---|---|---|
| 438,187 | Roth | Oct. 14, 1890 |
| 824,922 | Fahl | July 3, 1906 |
| 918,194 | Pocock et al. | Apr. 13, 1909 |
| 937,009 | Palmros | Oct. 12, 1909 |
| 999,220 | Harmon | Aug. 1, 1911 |
| 1,493,601 | Carlson | May 13, 1924 |
| 1,736,974 | King | Nov. 26, 1929 |
| 1,738,104 | Hall | Dec. 3, 1929 |
| 1,751,958 | Treiber | Mar. 25, 1930 |
| 2,346,152 | Clark | Apr. 11, 1944 |
| 2,506,736 | Ochswald | May 9, 1950 |

FOREIGN PATENTS

| | | |
|---|---|---|
| 848,589 | Germany | Sept. 4, 1952 |

OTHER REFERENCES

Ser. No. 450,936, Waseige (A. P. C.), published June 8, 1943.